United States Patent [19]

Botros

[11] 4,158,542
[45] Jun. 19, 1979

[54] ACYLDIHYDROXYBENZENE AZO DYES FOR METALLIZED POLYOLEFINS

[75] Inventor: Raouf Botros, Beech Creek, Pa.

[73] Assignee: American Color & Chemical Corporation, Charlotte, N.C.

[21] Appl. No.: 888,876

[22] Filed: Mar. 22, 1978

Related U.S. Application Data

[62] Division of Ser. No. 692,910, Jun. 4, 1976, abandoned.

[51] Int. Cl.² .................. C09B 45/00; D06P 1/10
[52] U.S. Cl. .................. 8/42 D; 8/41 D; 8/180; 260/206
[58] Field of Search .................. 8/42 D, 41 D

[56] References Cited

U.S. PATENT DOCUMENTS

| | | | |
|---|---|---|---|
| 2,008,602 | 7/1935 | Straub et al. | 8/5 |
| 2,174,998 | 10/1939 | Rossander et al. | 260/206 |
| 2,191,040 | 2/1940 | McNally et al. | 8/50 |
| 2,950,274 | 8/1960 | Kracker et al. | 260/206 |
| 3,257,379 | 6/1966 | May et al. | 260/149 |
| 3,389,956 | 6/1968 | Mohr et al. | 8/42 |
| 3,576,796 | 4/1971 | Jirou et al. | 260/208 |

FOREIGN PATENT DOCUMENTS

| | | | |
|---|---|---|---|
| 603103 | 8/1960 | Canada | 260/197 |

OTHER PUBLICATIONS

Hartley, P. N., "Coloration of Polypropylene" in International Dyer, 1965, vol. 134, pp. 541-543.

Primary Examiner—A. Lionel Clingman
Attorney, Agent, or Firm—Armstrong, Nikaido, Marmelstein & Kubovcik

[57] ABSTRACT

Acyldihydroxybenzene azo compounds of the formula

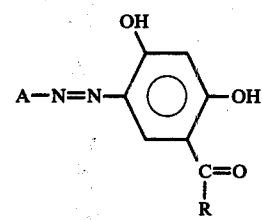

are provided where A represents a benzene radical which is unsubstituted or mono, di, or trisubstituted or a naphthalene radical which is unsubstituted or mono or disubstituted with any of alkyl of 1-4 carbon atoms, alkoxy of 1-4 carbon atoms, trifluoromethyl, cyano, nitro or halogen and R is alkyl of 1-4 carbon atoms, benzyl or phenyl. The compounds when applied to metallized polyolefin fabrics, particularly nickel-containing polypropylene fabrics, produce dyeings of strong bright shades which are exceptionally fast to light, dry cleaning, crocking, gas and heat.

12 Claims, No Drawings

ACYLDIHYDROXYBENZENE AZO DYES FOR METALLIZED POLYOLEFINS

This is a division, of application Ser. No. 692,910, filed June 4, 1976, now abandoned.

BACKGROUND OF THE INVENTION

1. Field of the Invention

The present invention relates to azo dyes useful in the dyeing of polyolefins. More particularly, the invention relates to acyldihydroxybenzene azo dyes which have utility in the dyeing of metallized, or metal-containing polyolefin, especially nickel-containing polypropylene textile materials.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes, more particularly, chelatable dyes, having specific utility in the dyeing of such metal-containing, or metal-modified, polypropylene are reported extensively in the literature. Chelatable azo dyes disclosed for use in dyeing metallized polyolefin commonly contain o,o'-dihydroxyazo; o-hydroxy-o'-carboxyazo; o-hydroxy-o'-aminoazo; or o-carboxy-o'-aminoazo chelatable groups. Certain azomethine structures similarly substituted ortho to the —C=N— link have also been reported.

Thus, for example, Siegrist et al, U.S. Pat. No. 3,399,027, discloses a process for dyeing polyolefins containing organic nickel chelate complexes with an aqueous dispersion of an azomethine dye. As the azomethine dyes there are disclosed dyes of the formulas:

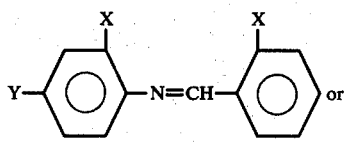

or

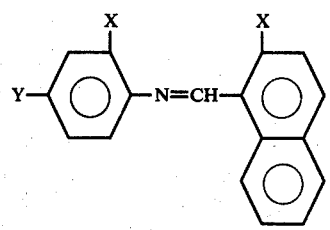

where
X is OH or COOH, and
Y is phenylazo or naphthylazo.

Mohr et al, U.S. Pat. No. 3,389,956, discloses the dyeing of nickel modified polypropylene textiles with an acyl-o,o'-dihydroxyazo or acyl-o-hydroxy-o'-carboxyazo dye of the formula:

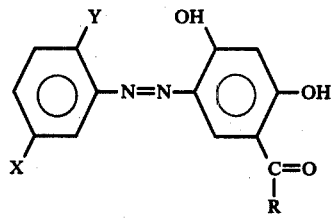

Y being hydroxy or carboxy.

Dyes having chelatable groups of the o,o'-dihydroxyazo and o-hydroxy-o'-carboxyazo type, however, do not produce acceptable shades on metallized polypropylene. Although these groups apparently bind strongly to the metal compound contained in the polypropylene and give dyeings having excellent fastness to rubbing, washing and dry cleaning, they tend to produce dull and rather weak colors. These dyes are also disadvantageous in that there is a drastic change in hue between the unchelated and chelated dyes which can cause unevenness on the metallized fiber depending on the concentration of metal throughout the fiber. This difference in hue between chelated and unchelated dyes may also cause differences in hue between the dyed pile of a carpet of a metal-containing polypropylene and the carpet backing, which is usually made from non-chelatable materials.

It is an object of the present invention, therefore, to provide dyes suitable for dyeing metal-containing, or metal-modified, polyolefins, and particularly, polypropylene, and which avoid or minimize the problems associated with the dyes heretofore employed in the art.

This and other objects of the invention will become apparent from the following summary and description of preferred embodiments.

SUMMARY OF THE INVENTION

According to the present invention acyldihydroxybenzeneazo dyes are provided which produce strong, bright shades when applied to metal-containing polypropylene fabrics and which are exceptionally fast to light, dry cleaning, crocking, gas and heat.

The dyes according to the invention may be represented by the general structure (I):

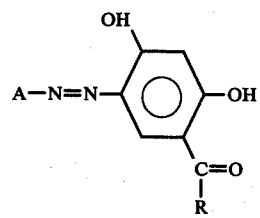

wherein
A is an unsubstituted or mono, di or trisubstituted benzene nucleus or an unsubstituted or mono or disubstituted naphthalene nucleus, the substituents being independently selected from alkyl of 1–4 carbon atoms, trifluoromethyl, alkoxy of 1–4 carbon atoms, cyano, nitro and halogen; and R is alkyl of 1–4 carbon atoms, benzyl or phenyl which is unsubstituted or substituted with up to two substituents independently selected from alkyl of 1–4 carbon atoms, alkoxy of 1–4 carbon atoms and halogen.

According to another embodiment of the invention there is provided metal-modified polyolefin textile material dyed with a dye of the general formula (I). The dyed polyolefin textile material has outstanding fastness properties.

DETAILED DESCRIPTION

In the dyes of the present invention represented by the formula (I), A is a benzene nucleus which is unsubstituted or mono, di or trisubstituted or a naphthalene nucleus which is unsubstituted or mono or disubstituted. The substituents may be the same or different and are selected from alkyl of 1-4 carbon atoms, alkoxy of 1-4 carbon atoms, nitro, trifluoromethyl, cyano, chlorine and bromine. Substitution in the benzene nucleus relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

The member R of the dyes according to the present invention is selected from alkyl of 1-4 carbon atoms, benzyl and phenyl. The phenyl may be optionally substituted with up to two substituents independently selected from alkyl of 1-4 carbon atoms, alkoxy of 1-4 carbon atoms, chlorine and bromine. Typically, the phenyl group will be unsubstituted.

The dyes are obtained by diazotizing an aromatic amine of the formula A—NH$_2$, where A is as defined above, and coupling into the appropriate 1-acyl-2,4-dihydroxybenzenes.

As suitable diazotizable aromatic amines, there may be mentioned 4-nitroaniline; o-anisidine; o-aminobenzotrifluoride; 3-chloro-o-toluidine; 4-nitro-3-chloro-o-toluidine; 4-chloro-3-aminobenzotrifluoride; anthranilonitrile; p-ethylaniline; p-n-butylaniline; 2,6-dichloro-4-nitroaniline; m-aminobenzotrifluoride; o-phenetidine; 4-nitro-2-chloroaniline; 2,6-dichloroaniline; 5-amino-2-chlorobenzotrifluoride; 2,4-dimethoxyaniline; 2,4-dimethoxy-5-chloroaniline; 1-naphthylamine; 4-nitro-1-naphthylamine; 2,4-dichloro-1-naphthylamine; 4-methoxy-1-naphthylamine and 5-bromo-1-naphthylamine. Preferred aromatic amines are those substituted with alkyl or alkoxy groups. Other aromatic amines may, of course, be employed as a starting material to prepare the azo dyes according to the invention. The choice of suitable aromatic amines is believed to be limited only be economic considerations and availability.

Suitable 1-acyl-2,4-dihydroxybenzenes which can be used as couplers include 2,4-dihydroxybenzophenone, 2,4-dihydroxyacetophenone and 2,4-dihydroxypropiophenone. All 1-acyl-2,4-dihydroxybenzenes where R is as defined above are believed to be useful in preparing dyes according to the present invention, which when applied to metal-containing, particularly nickel-containing polypropylene, will give the outstanding properties noted above. The actual choice of couplers, however, will generally be limited by economic considerations and availability.

Diazotization of the aromatic amine and coupling of the diazotized amine into the appropriate couplers are carried out in conventional ways. Diazotization of the aromatic amine is effected by heating it (if necessary to achieve solution) in an aqueous solution of strong mineral acid such as hydrochloric acid, cooling the resulting solution to a temperature of 0°-10° C., and adding thereto a quantity of sodium nitrite slightly in excess of the stoichiometric requirement. An alternate method of diazotization involves dissolving sodium nitrite in concentrated sulfuric acid, heating to a temperature of about 60°-70° C., cooling the resulting solution to 0°-10° C. and adding thereto the aromatic amine.

The coupling reaction is carried out by adding the diazonium salt to a cold aqueous alkaline solution of the respective coupler. The mixture is allowed to react until the coupling is essentially complete, usually in 1-24 hours at 0° C. to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

The azo dyes (I) of the present invention have outstanding utility in the dyeing of metal-containing polyolefins and especially, nickel-containing polypropylene fiber materials. The dyed metal-modified polypropylene fiber materials according to the present invention include as the starting polypropylene fiber material any of the conventionally produced polypropylene materials generally designated in the textile art as "polypropylene fibers", which contain Werner Complex forming metal such as aluminum, nickel, zinc and the like either as such or in the form of its salts or chelates. The exact metal content of these fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials dyed with the structure of formula (I) have been shown to have excellent fastness properties. Such nickel-containing polypropylene materials are available commercially, for example, under the trademark HERCULON.

To prepare the dye for application to the metal-modified fiber substrates, it must be suitably dispersed. This may be done by any of several well-known methods, e.g. milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersant for powders, or water for pastes. Other materials such as preservatives, foam-control agents, and wetting agents (for powders) may be added as desired.

Dispersed pastes are made by wet milling the azo material in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g. the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5-40 percent by weight (pure color) active dye base.

Disperse powders are prepared by wet milling color in the presence of a dispersent, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkylaryl polyether alcohol may be added to aid in wetting out the product when it is placed in the dye bath. Disperse powders are usually cut or standardized to 10-50 percent by weight color content (pure color).

The disperse dyes may be applied to the metal-containing polypropylene fibers or fabrics in a manner conventional in the dyeing of disperse dyestuffs and may be applied, for example, as neutral, acidic, or alkaline aqueous suspensions, with the use of dispersing agents, from a dyebath, preferably at temperatures of from 50° C. to 105° C. When temperatures of less than about 100° C. are employed, it is sometimes advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° C. and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing carpet printed with dyes of the formula (I) show excellent fastness properties. The fabric is colored with strong, bright yellowish orange to brown hues which are exceptionally fast to light, dry cleaning, crocking, gas and heat.

The invention may be better understood by referring to the working examples set forth below. In the working examples, the properties of dyed or printed polypropylene were evaluated according to the following tests:

Test No. 1: (Crocking) A crock test on an air dried sample, i.e., a portion of printed or dyed fiber, fabric or carpet construction, is conducted in accordance with AATCC Test Method 8-1972, page 112 of the 1974 Technical Manual of AATCC.

Test No. 2: (Heat stability) A heat stability test determined by subjecting an air dried sample to a heat treatment of 250° F. for 20 minutes. The heat treated sample is compared to an air dried sample with respect to shade change.

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 to 4L4 exposures are the lower limit of desirability in the carpet trade.

Test No. 5: (Dry cleaning) An air dried sample is tested for color fastness to dry cleaning in accordance with AATCC Test Method No. 132-1973, page 117 of the 1974 Technical Manual of the AATCC.

COMPARATIVE EXAMPLE I

A. Preparation of the Azo-Compound

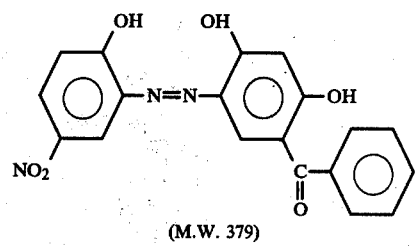

(M.W. 379)

A mixture of 29.1 g. 2-amino-4-nitrophenol in 90 g. hydrochloric acid, 32%, 800 ml. water and 4 g. Tween 20 was heated at 95° C. to complete solution. The clear solution was cooled to 0° C. with ice, and was diazotized with 13.3 g. sodium nitrite dissolved in 50 ml. water. The diazo solution was stirred at 0° C. for one hour and was then added during 30 minutes at 0° C. to a solution of 41 g. 2,4-dihydroxybenzophenone in 700 ml. water which contained 8.5 g. sodium hydroxide flakes and 130 g. sodium carbonate. The coupling mixture was stirred to room temperature overnight. Then there was added 250 g. sodium chloride and the reaction mixture was stirred for one hour. It was thereafter filtered, and the cake was washed with a 25% salt solution. The product was then reslurried in water and was made acidic to Congo Red paper with hydrochloric acid. The mass was filtered and the cake was washed neutral with water.

Yield: 35.9 g. Theory: 72 g. 30 g. of the product of (A) was charged to a sandmill with 45 g. Lignosol FTA (a commercially available ligninsulfonic acid dispersant sold by Lignosol Chemicals, Quebec, Canada) and 225 ml. water. The mixture was sandmilled until dispersion test was satisfactory.

Yield: 300 g. 10% color content paste.

B. Dyeing of a Nickel-containing Polypropylene from a Dyebath.

Piece goods of "Herculon" isotactic polypropylene containing a bis(p-alkylphenol)monsulfide nickel compound in the amount of about 0.12% calculated as metallic nickel by weight based on the weight of the polypropylene, were placed in a bath set at 35° C. containing 1% Triton X-100 (iso-octylphenyl-poly-ethoxyethanol) based on weight of fiber, 1.0-1.5% acetic acid (pH 3-4) and 1.0% (based on weight of fiber) dispersion of the dye from (A). After 5 minutes the temperature was raised to 95° C. over a 30 minutes period. The dyeing was continued at 95° C. for an additional 45 minutes. The piece goods were removed from the dye bath, rinsed and soaped in 0.5% soap solution at 90° C. for 10 minutes. The dyed fabrics were rinsed with water and dried. The dyed fabrics were colored a medium golden orange shade of poor light fastness. The exposed sample showed a considerable break at 2L4 exposures. The minimum light fastness requirement in the carpet trade is 3-4L4 units. Furthermore, the dyed sample showed excessive shade change upon heat treatment at 250° F. for 20 minutes.

C. Dyeing of a Nickel-containing Polypropylene with a Printing Paste.

A printing paste was prepared with 1000 parts of Tragacanth gum thickener (polysaccharides of galactose, fructose, xylose and arabinose with glucuronic acid), 5 parts acetic acid and a quantity of dispersed dye corresponding to 5 to 10 parts of a pure dye obtained in (A). A fabric made of fibers of polypropylene containing nickel (Herculon Type 40) was printed on a roller. The fabric was dried and steamed for 8 minutes at 105°-110° C. The fabric was vigorously washed in a bath of soap at 90° C. The printed fabrics were colored golden orange of fastness properties similar to those obtained in Part (B).

COMPARATIVE EXAMPLE II

To prepare the compound of the structure:

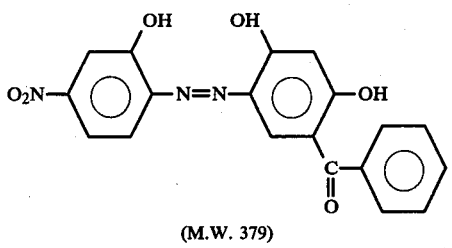

(M.W. 379)

a mixture of 23.1 g. 2-amino-5-nitrophenol in 90 g. hydrochloric acid, 32%, 400 ml. water and 2 g. Tween 20 was heated to 55° C. to complete solution. The clear solution was drowned into 300 g. ice, and was diazotized at 0° C. with a solution of 10.5 g. sodium nitrite dissolved in 100 ml. water. The diazo mixture was stirred at 0° C. for one hour. It was then added during 30 minutes at 0° C. to a solution of 32.1 g. 2,4-dihydroxybenzophenone in 500 ml. water which contained 12 g. sodium hydroxide flasks and 63 g. sodium carbonate. The coupling mixture was stirred to room temperature overnight. Then there was added enough salt to make a 20% salt solution, and the reaction mixture was stirred for two hours. It was thereafter filtered and the cake was washed with 4000 ml. 20% salt solution. The product was then reslurried in water and was made acidic to Congo Red paper with hydrochloric acid. The mass was filtered and the cake was washed neutral with water.

Yield: 47.3 g. Theory: 56.8 g.

The dispersed product, when printed on nickel-containing polypropylene (Herculon) in the manner of Comparative Example I(C), produced reddish brown shades of poor color value. Heat stability was also rated poor due to extensive shade change after heat treatment. Furthermore, the light fastness was rated as 2L4 which is not acceptable in the carpet trade.

COMPARATIVE EXAMPLE III

To prepare the compound of the structure:

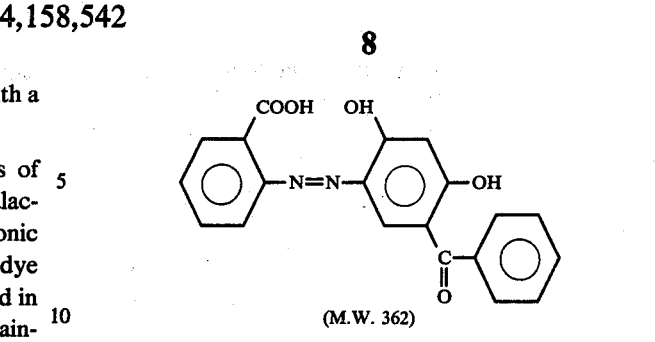

(M.W. 362)

a mixture of 20.6 g. anthranilic acid in 60 g. hydrochloric acid, 32%, and 100 ml. water was heated to 40° C. to complete solution. The clear solution was iced to 0° C. and was diazotized with a solution of 10.5 g. sodium nitrite dissolved in 50 ml. water. The diazo solution was stirred at 0° C. for one hour. It was then added during 30 minutes to a solution of 32.1 g. 2,4-dihydroxybenzophenone dissolved in 500 ml. water which contained 12 g. sodium hydroxide flakes and 167 g. sodium carbonate. After the coupling was complete, the product was salted out by adding 400 g. sodium chloride. The mixture was filtered and the cake was washed with 1000 ml. 20% salt solution. The product was then reslurried in water and was made acidic to Congo Red paper with hydrochloric acid. The mixture was filtered and the cake was washed neutral with water.

Yield: 48.8 g. Theory: 54.3 g. The dispersed product dyed nickel-containing polypropylene carpets (Herculon) in weak orange shades. The heat stability was rated very poor due to excessive change in shade after heat treatment. The light fastness was rated 2L4 which is below the minimum requirement in the carpet trade.

EXAMPLE I

To prepare the compound of the structure:

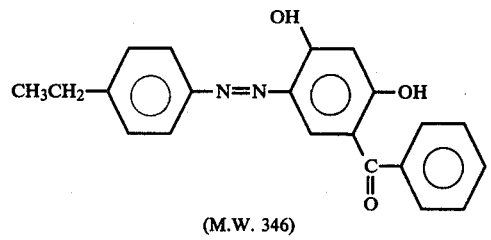

(M.W. 346)

a mixture of 24.2 g. p-ethylaniline in 60 g. hydrochloric acid, 32%, 1000 ml. water and 2 g. Tween 20 was stirred to complete solution. The clear solution was iced to 0° C., and was diazotized with a solution of 14 g. sodium nitrite dissolved in 50 ml. water. The diazo solution was stirred at 0° C. for one-half hour. It was then added during 30 minutes to a solution of 42.8 g. 2,4-dihydroxybenzophenone dissolved in 1000 ml. water which contained 16 g. sodium hydroxide flakes and 63 g. sodium carbonate. After coupling was complete, the reaction mixture was filtered and the cake was washed with 500 ml. 20% salt solution. The product was then reslurried in water and was made acidic to Congo Red paper with hydrochloric acid. The mixture was filtered and the cake was washed neutral with water.

Yield: 57.6 g. Theory: 69.2 g.

The dispersed product when applied to nickel-containing polypropylene carpets (Herculon) by the dyeing and printing process of Comparative Example I(B) and I(C) produced brilliant reddish orange shades of excellent color value. The dyed sample did not show any change in shade after heat treatment. The light fastness was rated 6L4 which is considered to be excellent. Resistance to crocking and dry cleaning solvents was rated very good.

EXAMPLE II

To prepare the compound of the structure:

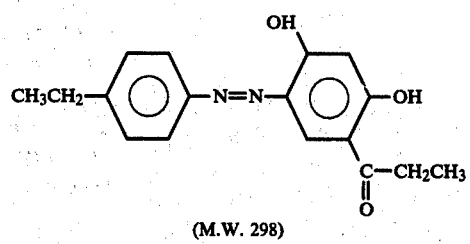

(M.W. 298)

18.2 g. of p-ethylaniline was diazotized according to the procedure described in Example I. The clear diazo solution was added during 30 minutes to a solution of 24.9 g. 2,4-dihydroxypropiophenone dissolved in 500 ml. water which contained 12 g. sodium hydroxide flakes and 47 g. sodium carbonate. After the coupling was complete, the mixture was filtered and the cake was washed neutral with 5% salt solution. The product was then reslurried in water and was made acidic to Congo Red paper with hydrochloric acid. The mixture was filtered and the cake was washed neutral with water.

Yield: 37.9 g. Theory: 44.7 g. The dispersed product dyed nickel-containing polypropylene (Herculon) in strong bright golden orange shades of excellent light fastness and heat stability. Other properties such as crocking and resistance to dry cleaning solvents were equally good.

EXAMPLE III

To prepare the compound of the structure:

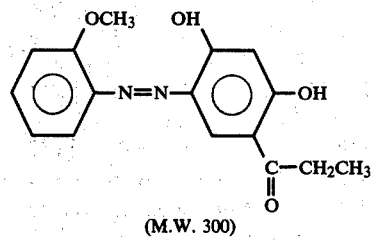

(M.W. 300)

a mixture of 18.5 g. o-anisidine in 60 g. hydrochloric acid, 32%, and 300 ml. water was stirred to complete solution. The clear solution was iced to −5° C. and was diazotized with a solution of 10.5 g. sodium nitrite dissolved in 50 ml. water. The diazo solution was stirred at −5° C. to 0° C. for 45 minutes. It was then added during 30 minutes to a solution of 24.9 g. 2,4-dihydroxypropiophenone dissolved in a mixture of 500 ml. water, 12 g. sodium hydroxide flakes and 42 g. sodium carbonate. After coupling was complete, the reaction mixture was filtered and the cake was washed neutral with water. The product was then reslurried in water and was made acidic to Congo Red paper with hydrochloric acid. The mixture was filtered and the cake was washed neutral with water.

Yield: 39.9 g. Theory: 45 g.

The dispersed product dyed nickel-containing polypropylene carpet (Herculon) in brilliant golden orange shades of very good color value. Shade was slightly redder after heat treatment. The light fastness was rated 8L4 which is considered to be outstanding. Resistance to crocking and dry cleaning solvents was rated excellent.

EXAMPLE IV

To prepare the compound of the structure:

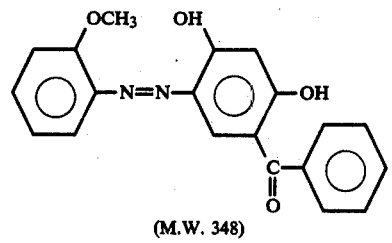

(M.W. 348)

18.5 g. o-anisidine was diazotized according to the procedure described in Example III. The clear diazo solution was added during 30 minutes to a solution of 32.1 g. 2,4-dihydroxybenzophenone dissolved in 500 ml. water which contained 12 g. sodium hydroxide and 42 g. sodium carbonate. After the coupling was complete, the mixture was filtered and the cake was washed with 700 ml. 20% salt solution. The product was then reslurried in water and was made acidic to Congo Red paper with hydrochloric acid. The mixture was filtered and the cake was washed neutral with water.

Yield: 36.8 g. Theory: 52.2 g.

The dispersed product dyed nickel-containing polypropylene carpets (Herculon) in attractive orange shades of excellent color value. The light fastness was rated 5L4 which is considered to be excellent. Other properties like heat stability, crocking and resistance to dry cleaning solvents were acceptable to the carpet trade.

EXAMPLE V

To prepare the compound of the structure:

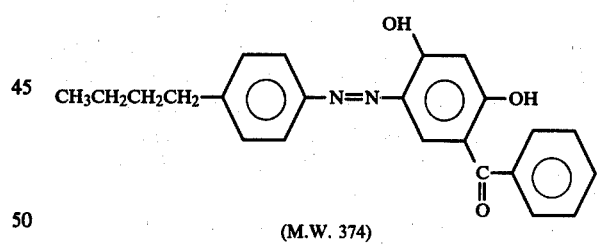

(M.W. 374)

a mixture of 22.4 g. p-n-butylaniline in 60 g. hydrochloric acid, 32%, 200 ml. water and 2 g. Tween 20 was stirred to complete solution. The clear solution was iced to 0° C., and was diazotized with a solution of 10.5 g. sodium nitrite dissolved in 100 ml. water. The diazo solution was stirred at 0° C. for one-half hour. It was then added during 30 minutes to a solution of 32.1 g. 2,4-dihydroxybenzophenone dissolved in 500 ml. water which contained 12 g. sodium hydroxide flakes and 30 g. sodium carbonate. After coupling was complete, the mixture was filtered and the cake was washed neutral with cold water. The product was then reslurried in water and was acidified with hydrochloric acid. The mixture was filtered and the cake was washed neutral with water.

Yield: 55.8 g. Theory: 56.1 g.

The dispersed product dyed nickel-containing polypropylene carpets (Herculon) in strong yellowish orange shades of outstanding light fastness and excellent heat stability and resistance to crocking and dry cleaning solvents.

EXAMPLE VI

To prepare the compound of the structure:

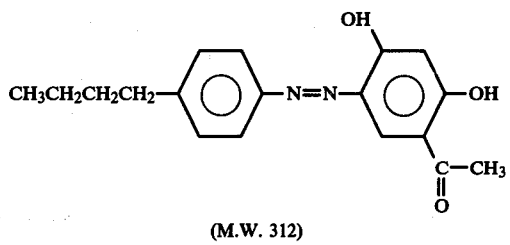

(M.W. 312)

the procedure of Example V was repeated with the exception that an equivalent quantity of 2,4-dihydroxyacetophenone was used instead of the 2,4-dihydroxybenzophenone. The above product was obtained in 87% of the theoretical yield. The dispersed product dyed nickel-containing polypropylene (Herculon) in bright yellowish orange shades of excellent general fastness properties, specially to light.

EXAMPLE VII

To prepare the compound of the structure:

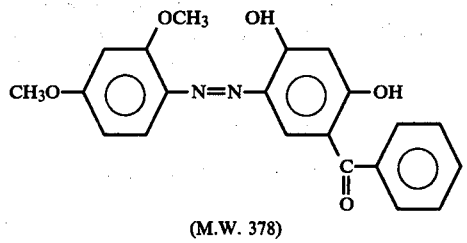

(M.W. 378)

a mixture of 23 g. 2,4-dimethoxyaniline in 60 g. hydrochloric acid, 32%, and 200 ml. water was stirred to complete solution. The clear solution was iced to 0° C., and was diazotized with 10.5 g. sodium nitrite dissolved in 100 ml. water. The diazo solution was stirred below 0° C. for one-half hour. Then it was added during 30 minutes to a solution of 32.1 g. 2,4-dihydroxybenzophenone dissolved in 500 ml. water which contained 12 g. sodium hydroxide flakes and 30 g. sodium carbonate. After coupling was complete, the mixture was filtered and the cake was washed neutral with water. The product was then reslurried in water and was acidified with hydrochloric acid. The mixture was filtered and the cake was washed neutral with water.

Yield: 50.2 g. Theory: 56.7 g.

The dispersed product dyed nickel-containing polypropylene (Herculon) in bright orange shades of excellent color value. Light fastness, crocking and resistance to dry cleaning solvents were very good.

EXAMPLE VIII

To prepare the compound of the structure:

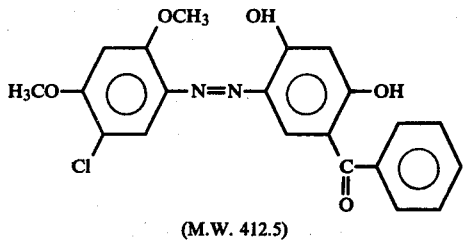

(M.W. 412.5)

if instead of the 2,4-dimethoxyaniline in Example VII an equivalent amount of 5-chloro-2,4-dimethoxyaniline was used, the above product was obtained in 95% of the theoretical yield. The dispersed product when printed on nickel-containing polypropylene (Herculon) produced strong yellowish brown shades having excellent light fastness and outstanding resistance to crocking and dry cleaning solvents.

EXAMPLE IX

To prepare the compound of the structure:

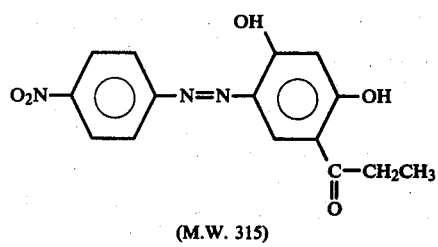

(M.W. 315)

a mixture of 20.7 g. p-nitroaniline in 60 g. hydrochloric acid, 32%, and 60 ml. water was heated at 70°-75° C. to complete solution. The hot clear solution was drowned into a mixture of 250 g. ice, 250 ml. water and 2 g. Tween 20. The mixture was diazotized with 10.5 g. sodium nitrite dissolved in 100 ml. water. The diazo solution was stirred at 0°-5° C. for one-half hour. It was then added during 30 minutes to a solution of 24.9 g. 2,4-dihydroxypropiophenone dissolved in 500 ml. water which contained 12 g. sodium hydroxide flakes and 42 g. sodium carbonate. After coupling was complete, the mixture was filtered and the cake was washed with 200 ml. 5% salt solution. The product was then reslurried in water and was made acidic to Congo Red paper with hydrochloric acid. The mass was filtered and the cake was washed neutral with water.

Yield: 43.5 g. Theory: 47.2 g.

The dispersed product dyed nickel-containing polypropylene (Herculon) in bright golden orange shades of good color value. Shade became little darker upon heat treatment. Light fastness, crock fastness and resistance to dry cleaning solvents were rated excellent.

EXAMPLES X-XXV

In accordance with the methods of operation described in the preceding examples, dyes are prepared by employing the amines and couplers shown in Table I. Nickel-containing polypropylene is dyed with each compound to produce dyeings having the shades indicated in the table.

TABLE I

| Ex. | Amine | Coupler | Shade |
|---|---|---|---|
| X | 2-ethoxyaniline | 2,4-dihydroxy-(4-chlorobenzoyl)benzene | Orange |
| XI | 3-chloroaniline | 2,4-dihydroxy-(n-propoxycarbonyl)benzene | Orange |
| XII | 2-(n-butoxy)aniline | 2,4-dihydroxy-(4-methylbenzoyl)benzene | Orange |
| XIII | 2,6-dichloro-4-nitroaniline | 2,4-dihydroxy-(isobutyryl)benzene | Yellowish Brown |
| XIV | 3-nitroaniline | 2,4-dihydroxy-(2-methoxybenzoyl)benzene | Yellowish Orange |
| XV | 1-naphthylamine | 2,4-dihydroxy-(phenylacetyl)benzene | Brown |
| XVI | 4-nitro-1-naphthylamine | 2,4-dihydroxy-(4-bromobenzoyl)benzene | Reddish Brown |
| XVII | 3,4-dichloro-1-naphthylamine | 2,4-dihydroxy-propionylbenzene | Brown |
| XVIII | 5-bromo-1-naphthylamine | 2,4-dihydroxy-benzoylbenzene | Brown |

TABLE I-continued

| Ex. | Amine | Coupler | Shade |
|---|---|---|---|
| XIX | 4-methoxy-1-naphthylamine | 2,4-dihydroxy-acetylbenzene | Brown |
| XX | 5,8-dichloro-1-naphthylamine | 2,4-dihydroxy-propionylbenzene | Brown |
| XXI | 2-(trifluoromethyl)aniline | 2,4-dihydroxy-propionylbenzene | Yellowish Orange |
| XXII | 2-chloro-5-(trifluoromethyl)aniline | 2,4-dihydroxy-propionylbenzene | Yellowish Orange |
| XXIII | 3-(trifluoromethyl)aniline | 2,4-dihydroxy-propionylbenzene | Yellowish Orange |
| XXIV | 4-chloro-3-(trifluoromethyl)aniline | 2,4-dihydroxy-propionylbenzene | Yellowish Orange |
| XXV | 2-cyanoaniline | 2,4-dihydroxy-propionylbenzene | Yellowish Orange |

Although the invention has been described in conjunction with the foregoing examples, it is not to be limited thereto, but instead includes all those embodiments within the scope and spirit of the appended claims.

What is claimed is:

1. Metallized polyolefin dyed with an acyldihydroxybenzene azo compound of the formula:

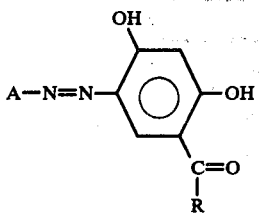

wherein
A is phenyl, phenyl substituted by up to three substituents, naphthyl or naphthyl substituted by up to two substituents, the substituents being independently selected from alkyl of 1-4 carbon atoms, alkoxy of 1-4 carbon atoms, trifluoromethyl, cyano, nitro, chlorine and bromine; and
R is alkyl of 1-4 carbon atoms, benzyl, phenyl, or phenyl substituted by up to two substituents independently selected from alkyl 1-4 carbon atoms, alkoxy of 1-4 carbon atoms, chlorine and bromine.

2. The dyed metallized polyolefin of claim 1 wherein the azo compound is:

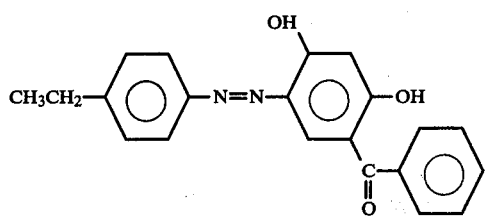

3. The dyed metallized polyolefin of claim 1 wherein the azo compound is:

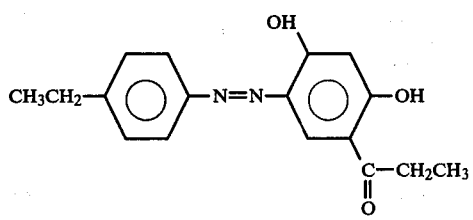

4. The dyed metallized polyolefin of claim 1 wherein the azo compound is:

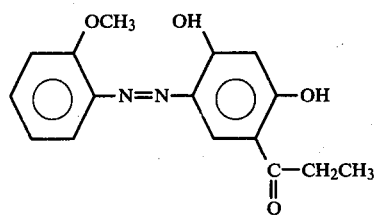

5. The dyed metallized polyolefin of claim 1 wherein the azo compound is:

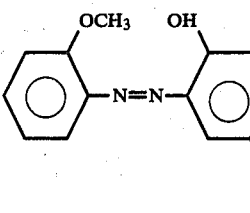

6. The dyed metallized polyolefin of claim 1 wherein the azo compound is:

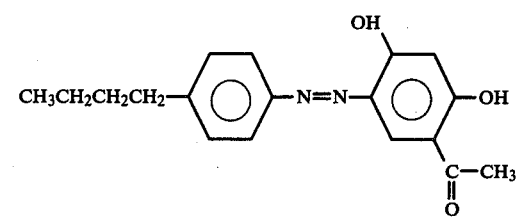

7. The dyed metallized polyolefin of claim 1 wherein the azo compound is:

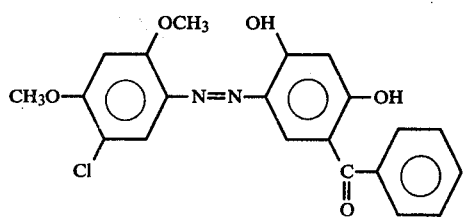

8. The dyed metallized polyolefin of claim 1 wherein the azo compound is:

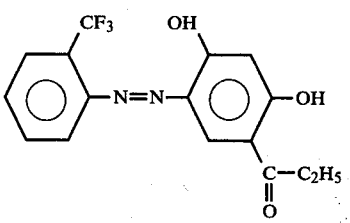

9. The dyed metallized polyolefin of claim 1 wherein the azo compound is:

10. The dyed metallized polyolefin of claim 1 wherein the azo compound is:

11. The dyed metallized polyolefin of claim 1 wherein the azo compound is:
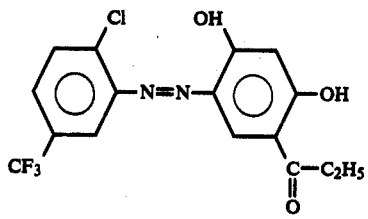
12. The dyed metallized polyolefin of claim 1 wherein the azo compound is:
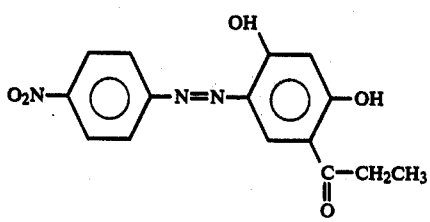
* * * * *